E. A. TRENHOLM.
SPIRIT LEVEL.
APPLICATION FILED OCT. 23, 1913.
1,130,552.
Patented Mar. 2, 1915.
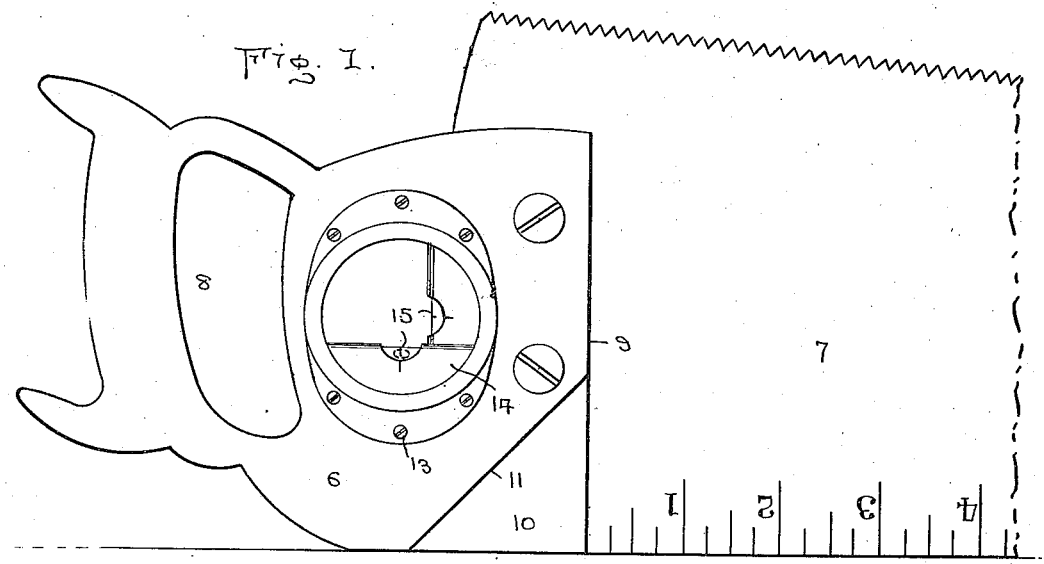
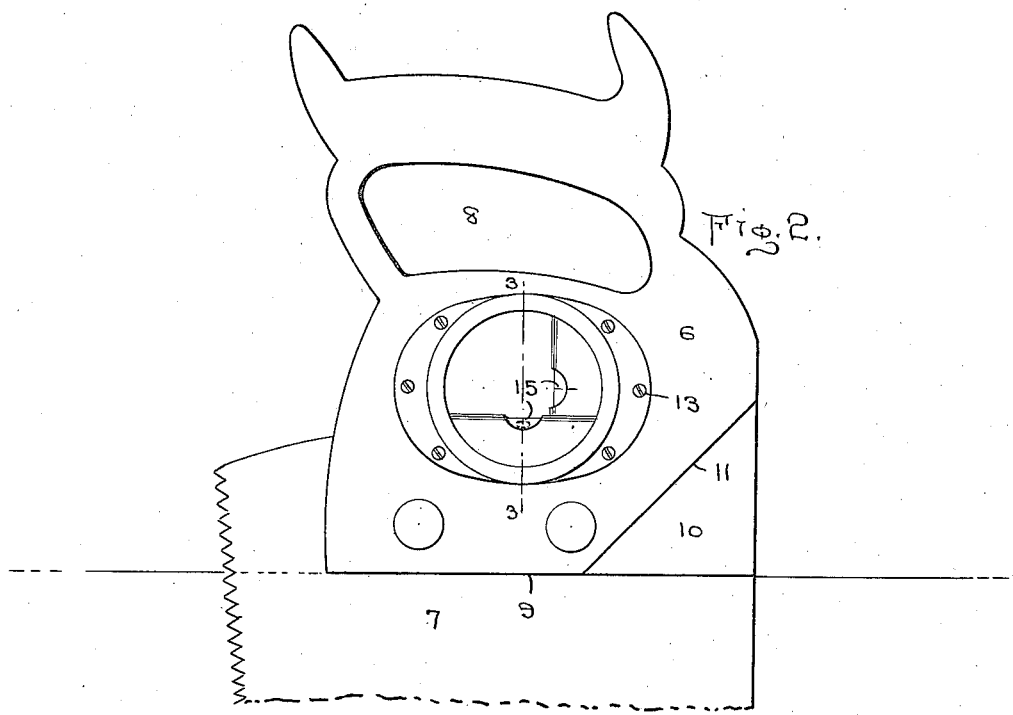
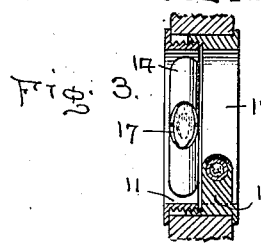

UNITED STATES PATENT OFFICE.

EPHRAIM ALLEN TRENHOLM, OF SPARTA, MINNESOTA.

SPIRIT-LEVEL.

1,130,552.

Specification of Letters Patent.

Patented Mar. 2, 1915.

Application filed October 23, 1913. Serial No. 796,933.

*To all whom it may concern:*

Be it known that I, EPHRAIM ALLEN TRENHOLM, a citizen of the United States, residing at Sparta, in the county of St. Louis and State of Minnesota, have invented certain new and useful Improvements in Spirit-Levels; and I do hereby declare the following to be a full, clear, and exact description of the invention, such as will enable others skilled in the art to which it appertains to make and use the same.

My invention relates to hand saws, and it has for its object to provide an improved saw handle and levels therefor.

Another object of the invention is to provide improved mountings for the levels, for rigidly and accurately securing the latter to the saw handle.

In the accompanying drawing, wherein is shown an approved embodiment of the invention, Figure 1 is a side elevation of part of a saw embodying my invention. Fig. 2 is a similar view thereof, showing the saw in another position. Fig. 3 is a sectional view on the line 3—3 of Fig. 2.

Referring to the drawing in detail, wherein similar reference numerals designate corresponding parts throughout the several views, 6 indicates the handle of the saw in which is secured in any preferred manner a blade 7. A hand hole 8 of any desired shape is formed in the handle 6. The top or back of the saw blade and handle are formed in perfect alinement, and the edge 9 of the handle is at right angles to the line of the saw and handle backs, thus providing two leveling surfaces for the levels to be hereinafter described, as well as a square for obvious purposes. The corners of the blade are cut away at 10 to provide the oblique surfaces 11, for laying off bevels, as will be understood. The handle 6 is provided with an opening intermediate the hand hole 8 and blade 7 for the reception of a pair of collars 11 and 12, having external and internal screw threads respectively. The outer edges of the collars are flanged and adapted to be secured against the side faces of the handle 6 by screws 13. In this way the collars are secured together and also to the handle of the saw. Each collar is provided with an opening communicating with a housing 14 which are connected thereto in any desirable manner, in which is removably seated a level 15, and said collars are so arranged relatively as to dispose the levels at right angles to each other. The levels are visible from either side of the handle 6 through suitable openings 17 formed in the housings 14, and are held in position within said housings by a removable packing 18, or the like.

What I claim is:—

1. In a combination with a stock having a transverse aperture therethrough, a collar adapted to seat in said aperture, said collar being internally screw threaded for a portion of its length, a second collar externally screw threaded and adapted to mate with the first said collar and a pair of spirit level tubes disposed one in each collar and at right-angles to each other.

2. In a combination with a stock having a transverse aperture therethrough, a collar adapted to seat in said aperture, said collar being internally screw threaded for a portion of its length, a second collar adapted to be threaded into the first said collar, a housing secured within each of said collars, and a pair of spirit-level tubes, one of which is positioned in each of said housings, so as to form a right-angle with each other.

3. In combination with a stock having a transverse aperture therethrough, a collar removably seated in said aperture, said collar being internally screw threaded for a portion of its length and having the non-screw threaded portion enlarged to form a shoulder adjacent the inner ends of said screw threads, a second collar adapted to be threaded into the first said collar and to have its inner terminal rest against said shoulder a pair of housings one of which is secured to each of said collars and a pair of spirit-level tubes one of which is adapted to be disposed within each of said housings.

4. The combination with a stock having a transverse aperture therethrough of a collar removably seated in said aperture, said collar being internally screw-threaded for a portion of its length and having the non-screw-threaded portion enlarged to form a shoulder adjacent the inner ends of said screw threads, a second and smaller collar adapted to be threaded into the first said collar and to have its inner terminal rest against said shoulder so that an unbroken passage is formed through said stock thereby, flanges formed on each of said collars, means for securing said flanges to said stock and a pair of level tubes disposed one in each collar and at right-angles to each other.

In testimony whereof I have signed my name to this specification in the presence of two subscribing witnesses.

EPHRAIM ALLEN TRENHOLM.

Witnesses:
　A. E. MacLEAN,
　TONIJ CHAMPO.